UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

PROTECTIVE COATING COMPOSITION.

1,085,100.  Specification of Letters Patent.  Patented Jan. 27, 1914.

No Drawing.  Application filed February 29, 1912.  Serial No. 680,775.

*To all whom it may concern:*

Be it known that I, LEO H. BAEKELAND, a citizen of the United States, residing at Yonkers, in the county of Westchester and State of New York, have invented certain new and useful Improvements in Protective Coating Compositions, of which the following is a specification.

In my prior United States Patent No. 942,809, patented December 7, 1909, I have described the production, in presence of basic condensing agents, of initial condensation products of phenols and formaldehyde which are fusible and soluble, but which are capable of transformation into infusible condensation products suited for many industrial applications.

The present invention relates to the preparation of aqueous solutions of initial condensation products prepared by the foregoing and other methods, such aqueous solutions presenting decided advantages for certain purposes, as for instance for use as protective coatings, paints or cements, over solutions in alcohol or other organic solvents.

I have found that organic solvents, for instance alcohol, when used in conjunction with the initial soluble condensation products of phenols and formaldehyde, exert a retarding effect upon the hardening process induced by the action of heat. For instance, the initial condensation product alone may be hardened to the infusible condition at temperatures as low as 70° C. and even less. If, however, alcohol is added, the resulting solution may be boiled in a return condenser for a long time without appreciable hardening of the mass; and if the amount of alcohol is sufficiently large, the boiling may be continued for days without effecting the transformation into an infusible product. I have found that water does not exert this retarding effect, and that aqueous solutions of the initial condensation product harden very rapidly and at lower temperatures than is the case when organic solvents are present. The use of aqueous solutions not only permits rapid hardening of the mass by application of heat, but has the further advantage of considerably cheapening the product, by obviating the need for expensive organic solvents. In order to prepare such aqueous solutions, the initial condensation product is dissolved in a slight excess of sodium hydroxid, potassium hydroxid, or the equivalents thereof; in other words, in a readily soluble hydroxid of an alkali metal. Such substances or mixtures as are capable of liberating soluble alkali hydroxid by secondary reaction may evidently be used for the same purpose, their action being equivalent to the direct use of alkali.

A simple method in accordance with my invention is as follows: The initial condensation product is first prepared by boiling together phenol or cresol and formaldehyde in suitable proportions, in presence of a small amount of a suitable basic, neutral or acid condensing agent. After the reaction has so far progressed that the initial condensation product separates from the supernatant liquid, it is dissolved in a solution of sodium hydroxid of sufficient concentration, and used in sufficient proportion only, to yield a solution of the initial condensation product, and this solution is then used as hereinafter explained.

For instance, I boil together 100 grams phenol, ½ gram NaOH, 90 grams commercial formaldehyde solution. The mixture is boiled for two hours or until the liquid separates into two layers, and, after cooling, there is added sufficient of a 4% solution of sodium hydroxid in water to obtain an aqueous solution. The solution so prepared keeps very well, but acquires a reddish color by oxidation. If this solution be heated to 80° C., it gradually turns to a gelatin-like mass, which, under further heating at the same or higher temperatures, hardens rapidly to a transparent, infusible body. When mixed with pigments or dyes, or with suspended materials such as oxid of iron, lead chromate, lamp-black, or the like, it can be made into a protective coating, paint or varnish, which under the action of heat hardens rapidly to an unusually hard and resistant layer. Mixed with asbestos, clay, sawdust, wood-pulp or other filler, it can be made into a paste which is readily kneaded or molded into any desired form, and which, on further subjection to a temperature of about 80° C. is converted rapidly into a very hard, infusible mass. Similar mixtures may also be used as cements. The solution may also be used for impregnating wood and other porous or absorbent bodies, which may afterward be submitted to a hardening process.

Instead of first preparing the initial condensation product, I may simply add at once a larger amount of sodium hydroxid, submit the mixture to boiling for a limited time, then cool rapidly, and use the solution thus directly prepared, diluting as may be necessary. For instance, I may use the following proportions: phenol, 100 grams; water, 100 cubic centimeters; sodium hydroxid, 6 grams; commerical formaldehyde solution, 90 grams. The mixture is boiled in a return condenser for about one hour, then cooled, and properly diluted with water.

Instead of preparing the initial condensation product directly by means of phenols and formaldehyde, I may proceed in any other way which will yield the same result, to-wit, an aqueous alkaline solution of the initial condensation product. For example, I may first prepare a permanently fusible and soluble condensation product in accordance with well-known methods (see Baekeland "On Soluble, Fusible, Resinous Condensation Products of Phenols and Formaldehyde", *Journal of Industrial and Engineering Chemistry*, Vol. I, No. 8, 1909; French Patent No. 361,539 to De Laire; British Patent No. 12,880 of 1902, to Blumer; and German Patent 85,588 to Bayer, etc.) On this substance I may react with formaldehyde, or such equivalents of formaldehyde as hexamethylentetramin or other suitable methylen compound, and dissolve the product thus prepared in an alkaline solution. Or I may first prepare a phenol-alcohol or its equivalent, add an alkali thereto, and then add a suitable proportion of formaldehyde or its equivalent.

In the practice of any of the above-mentioned methods for carrying the invention into effect, a certain proportion of other solvents may be added to the aqueous alkaline solution if desired. Similarly, various thickening agents such as starch, glue, silicate of soda, casein, etc., may be used for the purpose of modifying the physical or chemical properties of the paint or protective coating.

The protective coating herein described has been found particularly adapted for coating surfaces of Portland cement.

In the above specification, as well as in the following claims, the word "phenols" is meant to designate not only the first member of the phenol group, but its homologues and isomers, or phenolic bodies, or mixtures thereof, which are equivalent in this reaction. And in the same way the polymers of formaldehyde, or other substances which may engender formaldehyde, may be used as equivalents of formaldehyde.

I claim:—

1. As a new article of manufacture, a protective coating composition or varnish, containing a phenolic condensation product which is capable of transformation by heat into an insoluble and infusible body, dissolved in water containing the minimum proportion of alkali hydroxid requisite for the preparation of a stable solution of said condensation product.

2. As a new article of manufacture, a protective coating composition or varnish, containing a phenolic condensation product which is capable of transformation by heat into an insoluble and infusible body, dissolved in water containing the minimum proportion of alkali hydroxid requisite for the preparation of a stable solution of said condensation product, in conjunction with an inert filling material.

In testimony whereof, I affix my signature in presence of two witnesses.

LEO H. BAEKELAND.

Witnesses:
A. R. BRENNECKE,
HERBERT S. MAY.